(12) United States Patent
Bakker et al.

(10) Patent No.: US 6,913,238 B2
(45) Date of Patent: Jul. 5, 2005

(54) SUPPORT FOR AND METHOD FOR USE OF A PORTABLE COMPUTER

(75) Inventors: Willem Hendrik Bakker, Almere (NL); Jan Willem Elkhuizen, Leeuwarden (NL)

(73) Assignee: Bakker & Elkhuizen B.V., Almere (NL)

( * ) Notice: Subject to any disclaimer, the term of this patent is extended or adjusted under 35 U.S.C. 154(b) by 19 days.

(21) Appl. No.: 10/213,635

(22) Filed: Aug. 6, 2002

(65) Prior Publication Data
US 2003/0111582 A1 Jun. 19, 2003

Related U.S. Application Data (63) Continuation of application No. 09/713,783, filed on Nov. 15, 2000, now abandoned.

(30) Foreign Application Priority Data

Jul. 13, 2000 (NL) .............................................. 1015704

(51) Int. Cl.[7] .............................................. A48B 97/04
(52) U.S. Cl. ........................ 248/460; 248/917; 361/683
(58) Field of Search ................................ 248/460, 459, 248/454, 455, 456, 447, 446, 462, 166, 174, 148, 917, 922; 361/683, 685, 687

(56) References Cited

U.S. PATENT DOCUMENTS

| | | |
|---|---|---|
| 502,601 A | 8/1893 | Anderson et al. |
| 524,926 A | 8/1894 | Anderson et al. |
| 525,356 A | 9/1894 | Nelson |
| 527,108 A | 10/1894 | Cooper |
| 681,976 A * | 9/1901 | Rathvon ..................... 248/456 |
| 971,634 A | 10/1910 | Pilsbry |
| 1,096,327 A | 5/1914 | Thorniley |
| 1,275,195 A | 8/1918 | Apple |
| 1,409,525 A | 3/1922 | Cox |
| 1,822,261 A | 9/1931 | Apple |
| 1,913,790 A | 6/1933 | Buntschu et al. |
| 1,983,439 A | 12/1934 | De Vore |
| 2,454,526 A | 11/1948 | Savastano |
| 2,677,211 A | 5/1954 | Luketa |
| 2,720,251 A | 10/1955 | Luketa |
| 3,167,036 A | 1/1965 | Brossard |
| 3,381,928 A | 5/1968 | White |
| 3,920,276 A | 11/1975 | Sparrow |
| 4,085,961 A | 4/1978 | Brown |
| D253,981 | 1/1980 | Fritz et al. |
| 4,199,125 A | 4/1980 | Simon |

(Continued)

FOREIGN PATENT DOCUMENTS

| | | |
|---|---|---|
| EP | 0 837 386 | 4/1998 |
| JP | 6-232567 | 8/1994 |
| NL | 1003469 | 7/1996 |
| WO | 00/17736 | 3/2000 |

OTHER PUBLICATIONS

All Office magazine, Fall 1998, pp. 1,3,17,19–25.
http://www.be–ken.com/index.htm—Apr. 20, 2000.
Information brochure of Bakker & Elkhuizen Ergonomie.

Primary Examiner—Anita M. King
(74) Attorney, Agent, or Firm—Merchant & Gould P.C.

(57) ABSTRACT

Support for a portable computer having a display flap which is pivotable relative to a keyboard member. For supporting the keyboard member, there is provided a support structure. A bearing structure projects downwards from the support structure for keeping the display of the computer at a distance above a face on which the support stands. A document support supports a document extending above the support structure. A display of a portable computer can thereby be placed at an ergonomically favorable height above the worktop, while loss of space for documents is limited and documents to be consulted can be supported at an ergonomically favorable height above the worktop. A method for the use of a portable computer is likewise described.

13 Claims, 5 Drawing Sheets

U.S. PATENT DOCUMENTS

| | | |
|---|---|---|
| 4,307,672 A | 12/1981 | Shikimi |
| 4,313,112 A | 1/1982 | Foster |
| 4,437,638 A | 3/1984 | Scheibenpflug |
| 4,500,134 A | 2/1985 | Kaneko et al. |
| 4,515,086 A | 5/1985 | Kwiecinski et al. |
| 4,522,364 A * | 6/1985 | Charney et al. ............ 248/460 |
| 4,562,987 A | 1/1986 | Leeds et al. |
| 4,567,835 A | 2/1986 | Reese et al. |
| 4,571,456 A | 2/1986 | Paulsen et al. |
| 4,600,255 A | 7/1986 | Dubarko |
| 4,619,429 A | 10/1986 | Mazza |
| 4,635,893 A * | 1/1987 | Nelson ........................ 248/558 |
| 4,657,214 A | 4/1987 | Foster |
| 4,685,647 A | 8/1987 | Calhoun |
| 4,706,575 A | 11/1987 | Hamlin |
| 4,708,312 A | 11/1987 | Rohr |
| 4,717,112 A * | 1/1988 | Pirkle ......................... 248/639 |
| 4,742,478 A | 5/1988 | Nigro, Jr. et al. |
| 4,747,572 A | 5/1988 | Weber |
| 4,790,506 A | 12/1988 | Malinowski et al. |
| 4,830,328 A | 5/1989 | Takach, Jr. et al. |
| 4,832,303 A | 5/1989 | Myeeo |
| 4,863,124 A | 9/1989 | Ball et al. |
| 4,863,140 A | 9/1989 | Schriner |
| 4,893,775 A | 1/1990 | Long |
| 4,913,502 A | 4/1990 | Russell |
| 4,934,853 A | 6/1990 | King |
| 4,974,808 A | 12/1990 | Ball |
| D321,293 | 11/1991 | Kucsak |
| 5,106,047 A * | 4/1992 | Baer ........................ 248/459 |
| 5,122,941 A | 6/1992 | Gross et al. |
| D328,314 | 7/1992 | MacEwan |
| 5,149,047 A | 9/1992 | Tucker |
| 5,260,884 A | 11/1993 | Stern |
| D348,081 | 6/1994 | Cady |
| 5,323,291 A | 6/1994 | Boyle et al. |
| 5,377,598 A | 1/1995 | Kirchner et al. |
| 5,383,643 A | 1/1995 | Koch |
| D358,271 | 5/1995 | Leveen et al. |
| 5,436,792 A | 7/1995 | Leman et al. |
| 5,452,531 A | 9/1995 | Graville et al. |
| 5,503,361 A | 4/1996 | Kan-O et al. |
| D372,371 | 8/1996 | Grove, Jr. |
| 5,552,960 A | 9/1996 | Nelson et al. |
| D377,276 | 1/1997 | Hirsch et al. |
| 5,633,782 A | 5/1997 | Goodman et al. |
| D383,909 | 9/1997 | Salas |
| 5,704,212 A | 1/1998 | Erler et al. |
| 5,769,369 A | 6/1998 | Meinel |
| 5,771,814 A | 6/1998 | Clausen |
| 5,818,360 A | 10/1998 | Chu et al. |
| 5,822,185 A | 10/1998 | Cavello |
| 5,832,840 A | 11/1998 | Woof |
| 5,871,094 A | 2/1999 | Leibowitz |
| 5,899,421 A | 5/1999 | Silverman |
| 6,116,562 A | 9/2000 | Griffin |
| 6,256,193 B1 | 7/2001 | Janik et al. |
| 6,266,241 B1 | 7/2001 | Van Brocklin et al. |
| D451,306 | 12/2001 | Dow |
| 6,352,233 B1 * | 3/2002 | Barberich ................ 248/676 |
| D459,397 | 6/2002 | Zeller et al. |
| 6,490,154 B2 * | 12/2002 | Thompson ................ 361/686 |
| 6,491,278 B1 * | 12/2002 | Thomsen .................... 248/460 |
| 6,545,864 B2 * | 4/2003 | Davis, IV .................. 361/683 |

* cited by examiner

SUPPORT FOR AND METHOD FOR USE OF A PORTABLE COMPUTER

"This application is a continuation of application Ser. No. 09/713,783, filed Nov. 15, 2000, now abandoned which application(s) are incorporated herein by reference."

The invention relates to a support for and a method for the use of a portable computer having a keyboard and a display flap mounted so as to be pivotable relative to that keyboard.

In practice, portable computers having a keyboard and a display flap mounted so as to be pivotable relative to that keyboard are usually denoted by the term "laptop computer", "laptop" or "notebook". Such computers are used not only during travel, but are also used frequently and for a long period in offices, in particular by users who use the computer regularly in different offices and/or at home.

Such portable computer involves a number of ergonomic limitations. In the first place, the position of the display relative to the keyboard, regardless of the pivotability mentioned, is fixed and located close to the keyboard. As a consequence, either the position of the display is not sufficiently high, which causes a great risk of neck injuries, or, if the computer is placed higher, the position of the keyboard is too high, so that, inter alia, the shoulder muscles are supposed to be burdened unduly. In the second place, a laptop entails the drawback that it is not possible to place any documents between the keyboard and the display, which in practice is in fact desired in many cases.

For partially overcoming the above limitations, in practice, a laptop computer is often combined with a separate keyboard connected to the computer only via a wire or via a wireless connection. The portable computer can then be placed on a raised portion at a height such that the display is at the height desired by the user, while the keyboard with which the computer is operated stands on the worktop and the location of the keyboard can be freely determined by the user, independently of the location of the computer. As raised portion, a display support or a pile of books can for instance be used.

However, such solutions entail the problem that the keyboard of the laptop computer occupies usually scarce space on the worktop. In view of the usually small size of the display of laptop computers, it is generally neither attractive to place the computer further from the user in order to provide space between the computer and the separate keyboard. Another alternative solution consists in that, apart from a separate keyboard, a separate display is coupled to the laptop computer. However, this is a fairly costly solution which, moreover, will only be feasible at a single work station or a very limited number of work stations.

SUMMARY OF THE INVENTION

It is an object of the present invention to provide a solution which enables positioning a laptop computer for use in combination with a separate, additional keyboard or another separate control member at some height above a worktop and which also enables placing documents between the separate keyboard and the display without unduly increasing the distance between the keyboard and the display.

In accordance with the present invention, this object is realized by providing a support for a portable computer having a keyboard member and a display flap mounted so as to be pivotable relative to that keyboard member, which support has: a support structure for supporting at least a portion of the keyboard member, a bearing structure which, in operational condition, projects downwards from the support structure such that at least a portion of the support structure-supported keyboard member located adjacent the display flap is kept at a distance above a surface on which the support stands, and a document support for keeping positioned a document in an operational condition extending above the support structure.

In addition, the invention can also be used in the form of a method for the use of a portable computer having a keyboard member and a display flap mounted so as to be pivotable relative to that keyboard member, and a separate control member. In this method, a document between the display flap and the separate control member is visually consulted, the computer is operated via the separate control member, at least a portion of the keyboard member of the computer located adjacent the display flap is supported at a distance above a worktop, and the document is supported in a position in which it projects at least partially above the keyboard member.

Since there is provided a document support for keeping in position a document in an operational position in which it extends at least partially above and along the support structure, the support also forms a document support enabling consulting documents placed therein between the separate control member and the display flap. The documents are moreover located at some height above the worktop on which the support is placed, which is advantageous from an ergonomic viewpoint. The documents supported by the document support are in a position in which, considered from the position of the user, they are located in front of the keyboard member of the computer. However, this is not problematic, because the keyboard is not used in the operational situation.

DETAILED DESCRIPTION

Figure 1:
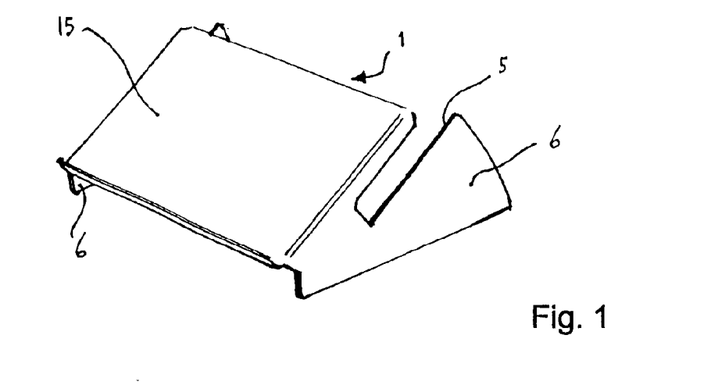
FIG. 1 is a perspective view of the support according to a first exemplary embodiment of the invention.
Figure 2:
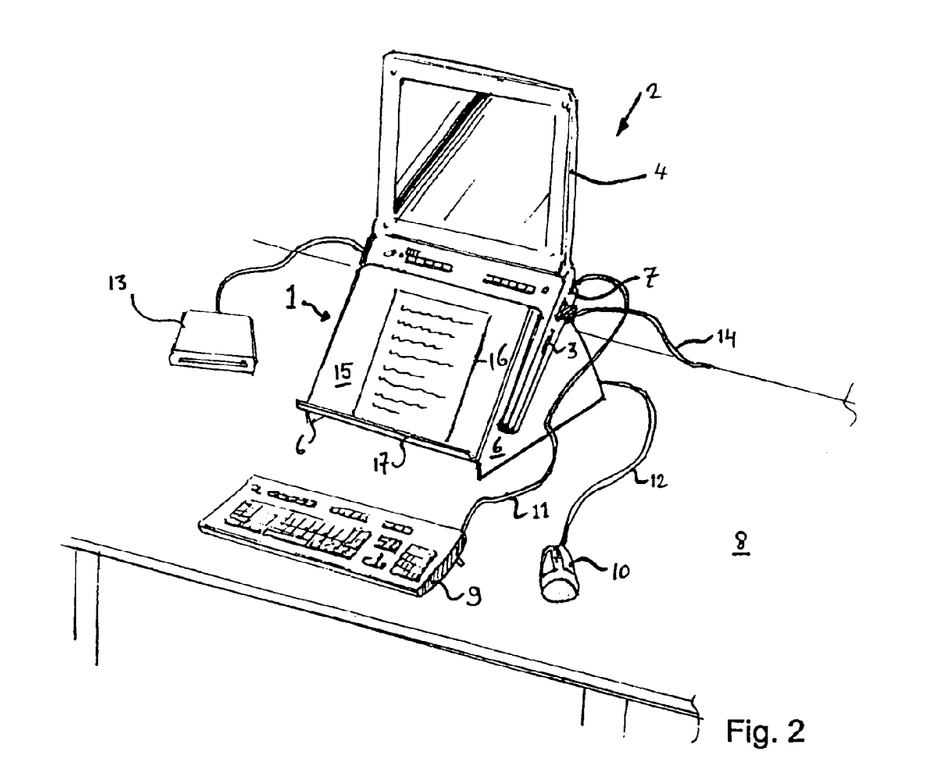
FIG. 2 is a perspective view of the support according to FIG. 1, in which a laptop computer is placed and with a support-supported document on a worktop, on which a keyboard and a diskette player/reader are placed as well.

The invention will first be specified with reference to the exemplary embodiment shown in FIGS. 1 and 2.

In FIGS. 1 and 2, a support in its entirety is designated by reference numeral 1. The support 1 is intended for receiving a portable computer 2 with a keyboard 3 and a display flap 4 mounted so as to be pivotable relative to said keyboard 3.

For supporting the keyboard member 3, the support 1 is provided with a support structure in the form of open, slotted recesses 5 in sidewalls 6 of the support 1, which recesses are upwardly inclined towards the rear.

The sidewalls 6 form a support structure which, in the operational condition shown, projects downwards from the recess 5, such that a portion 7 of the keyboard 3 supported by the edges of the recesses 5, which portion 7 is located adjacent the display flap 4, is kept at a distance above a face 8 on which the support 1 stands. Thus, the display flap 4—and hence the display is located at a distance above the worktop 8. Since the display is located at a distance above the worktop, the risk of neck complaints during working with the computer for a longer time, is limited. The computer 2 can be operated by means of control members in the form of a separate keyboard 9 and a mouse 10, connected to the computer 2 via cables 11, 12. Further, according to this example, a diskette player/reader 13 and a network cable 14 are coupled to the computer 2. Via the keyboard 9 and the mouse 10, the computer 2 can be operated comfortably, although the keyboard and the cursor control of the computer 2 itself are located at a relatively large distance from the user and are difficult to reach.

Although according to this example, the entire keyboard member 3 of the computer 2 is kept at a distance above the worktop 8, it is also possible that the keyboard member 3 is located on the side facing away from the display flap 4, adjacent the worktop 8, or is even supported by the worktop 8.

The support 1 further comprises a document support 15 for defining a support face for a document 16, which support face, in operational condition, extends above and along the support structure formed by the recess 5. A portion 7 of the keyboard member 3 of the computer 2 located adjacent the display flap 4 projects below the document support 15, and from that portion 7 of the keyboard member 3 located adjacent the display flap 4, the display flap 4 projects upwards behind and along the document support 15.

The document support 15 enables holding documents in a position above the keyboard member 3 of the computer 2 where these documents are properly visible to the user without the user having to look far down and without requiring placing the computer 2 in its entirety further from the user than the position of the remotest edge of the document 16. The fact that in this manner, the document 16 screens the keyboard member 3 of the computer 2 from the user is not problematic, because in the operational situation described, the computer is operated via the keyboard 9 and the mouse 10, which are both placed separate from the computer 2. In this manner, the surface of the keyboard member 3 of the computer 2 projected onto the worktop 8 is not lost for placing documents in a readable position.

If the user is positioned right in front of the computer 2, the user is in line with the additional (loose) keyboard 9, the document support 15 and the display 4, which offers ergonomic advantages and limits the physical load on, inter alia, the neck, for instance in that one no longer needs to look beside the keyboard 9 each time for consulting the documents.

The support 1 is narrower than the width of the computer 2, so that the computer 2 projects laterally relative to the support 1. In this manner, a relatively small support suffices for supporting small as well as wide computers. For the capacity of supporting documents 16, the slight width of the support 5 need not be an important problem, because usually, documents can project outside the document support 15 over some distance without bending to such an extend that the readability suffers therefrom.

In operational condition, the support structure formed by the recesses 5 is open on both sides. As illustrated by FIG. 2, this is advantageous, because sidewalls of the computer 2 are freely accessible for connecting cables to terminals in sidewalls of the keyboard member 3 of the computer 2, such as, in this example, the network cables 14 and the cable of the diskette player/recorder 13. This effect could also be realized on only one side if the support structure were open on only one side.

A similar advantage is realized in that, in operational condition, the support structure formed by the recesses 5 is open towards the rear. This advantage is used in the situation shown in FIG. 2, by connecting cables 11 and 12 of the separate keyboard 9 and the separate cursor control 10 to the rear side of the computer 2.

Along the lower edge of the document support 15, a support edge 17 projects upwards. In use, this support edge 17 forms a lower side of the document support 15 and prevents documents 16 from sliding from the document support 15.

A support 1 according to the example shown in FIGS. 1 and 2 may advantageously be manufactured from a blank from plastic, such as polymethyl metacrylate, or from metal bent over along bending edges between the sidewalls 6 and the document support 15 and between the document support 15 and the support edge 17. In that case, the sidewalls 6 are not collapsible. With such embodiment of the support 1, it is advantageous if the distance between the sidewalls 6 increases from the document support 15. Several supports 1 can then be nested, so that a greater efficiency can be realized during storage and transport. A slightly spread position of the sidewalls 6 is also advantageous for increasing the stability of the support resting on the worktop. A further possibility for increasing the stability consists in that the document support 15, at the front-lower side, is longer to such an extent that the front-lower edge below the support edge 17 rests on the worktop. A fixed embodiment of the support 1 offers the advantage of simplicity and robustness and is particularly suitable for permanent arrangements in offices.

However, it is also possible to design the transition between the sidewalls 6 and the document support 15, and also between the document support 15 and the support edge 17, as folding lines in a blank from plastic or even cardboard. The bearing structure then comprises flat parts in the form of the sidewalls 6 movable between an operational position projecting from the document support 15 and a transport position extending substantially parallel to the document support 15. The support I can then easily be brought into a flat configuration, which saves space when the support is not used. This is advantageous for readily taking along and storing the support 1.

Although the support can in principle be brought into a flat configuration in different manners, such as through disassembly of the sidewalls or, if applicable, of another bearing structure, it is advantageous that the bearing structure formed by the sidewalls 6 is pivotable relative to the document support 15, because thus, changing between the operational position and the flat storage and transport position can be performed in a very fast and simple manner and the sidewalls 6 need not be separated from the document support 15, as a consequence of which they can easily get lost.

Because the transitions between the sidewalls 6 and the document support 15 and also between the document support 15 and the support edge 17 are designed as folding lines, there is obtained a support which can be manufactured at very low costs and which can moreover be folded very flat.

Figure 3:
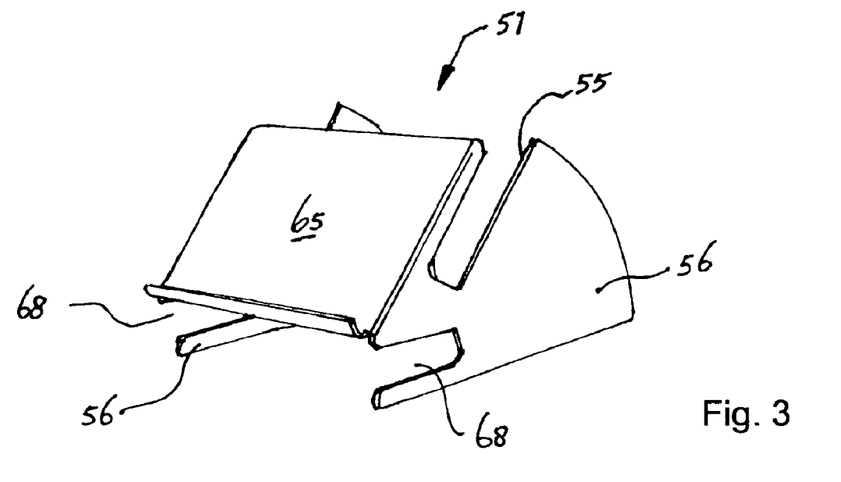
FIG. 3 is a perspective view of a variant of the support according to FIGS. 1 and 2.
Figure 4:
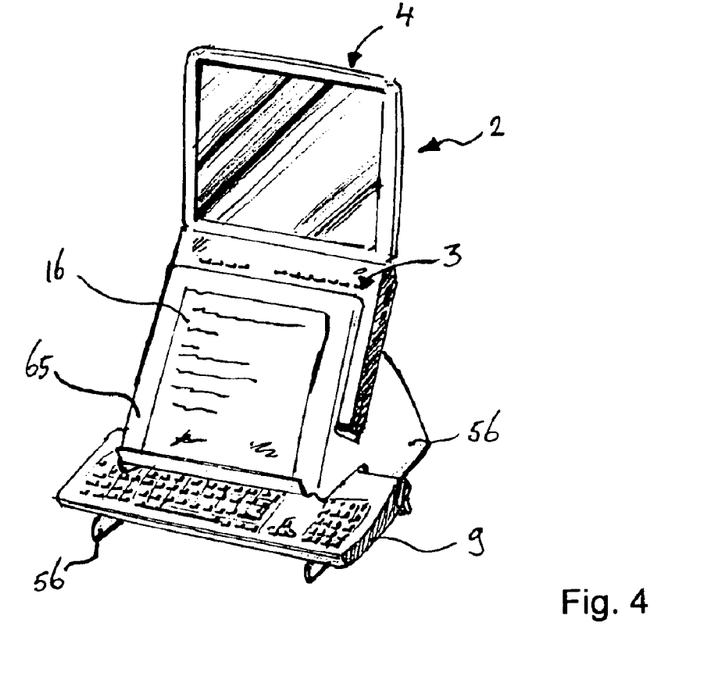
FIG. 4 is a perspective view of the support according to FIG. 3, in which a laptop computer and a keyboard are placed.

The support 51 shown in FIGS. 3 and 4 has sidewalls 56 and a document support 65. Recesses 55 have been provided in the sidewalls 56. By also providing recesses 68 at the front side of the support 51 and below the document support 65 in the sidewalls 56, there is created the possibility of inserting the loose keyboard 9 into these recesses 68 of the sidewalls, so that the loose keyboard 9 does not occupy any space on the worktop when it is not used. As the bearing structure formed by the sidewalls 56 continues to a position below the recesses 68 for receiving the keyboard 9, the support 51 rests on the worktop at least to a position adjacent the end which, in use, faces the user, and the risk of the support 51 tilting forwards, for instance when the support is pushed against, is limited.

Figure 5:
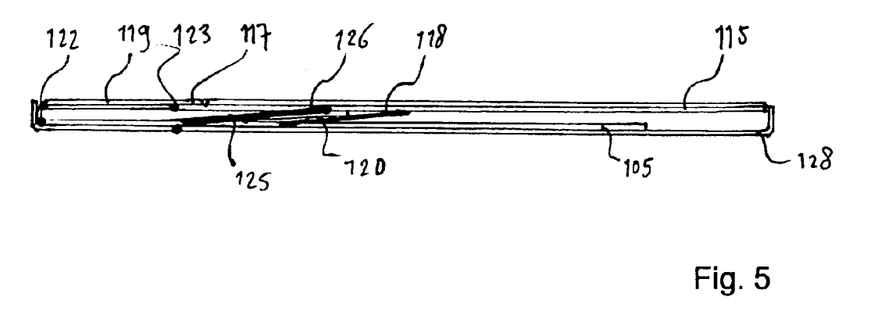
FIG. 5 is a side elevation of a support according to a further exemplary embodiment of the invention, in folded condition.
Figure 6:
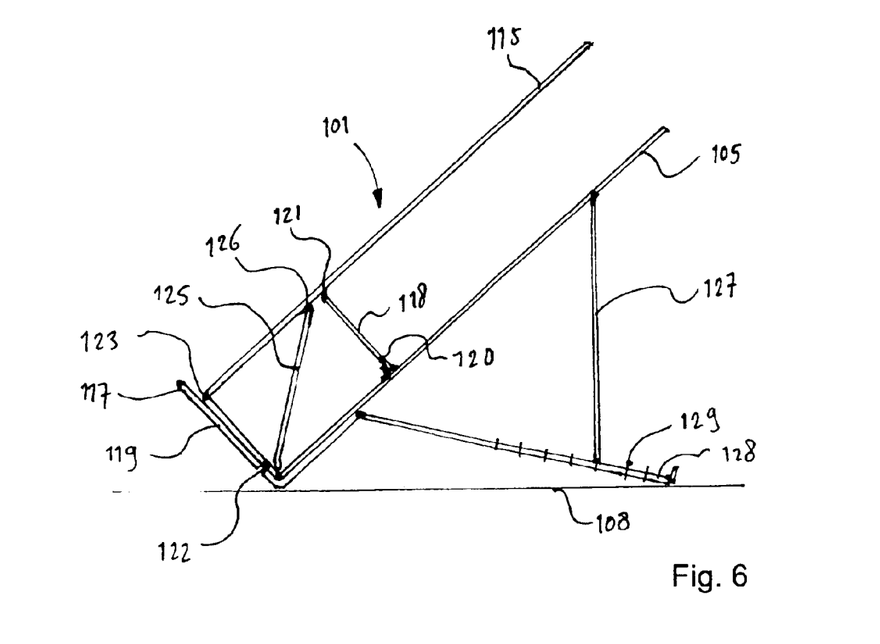
FIG. 6 is a side elevation of the support according to FIG. 5 in operational condition, with a laptop computer placed therein.
Figure 7:
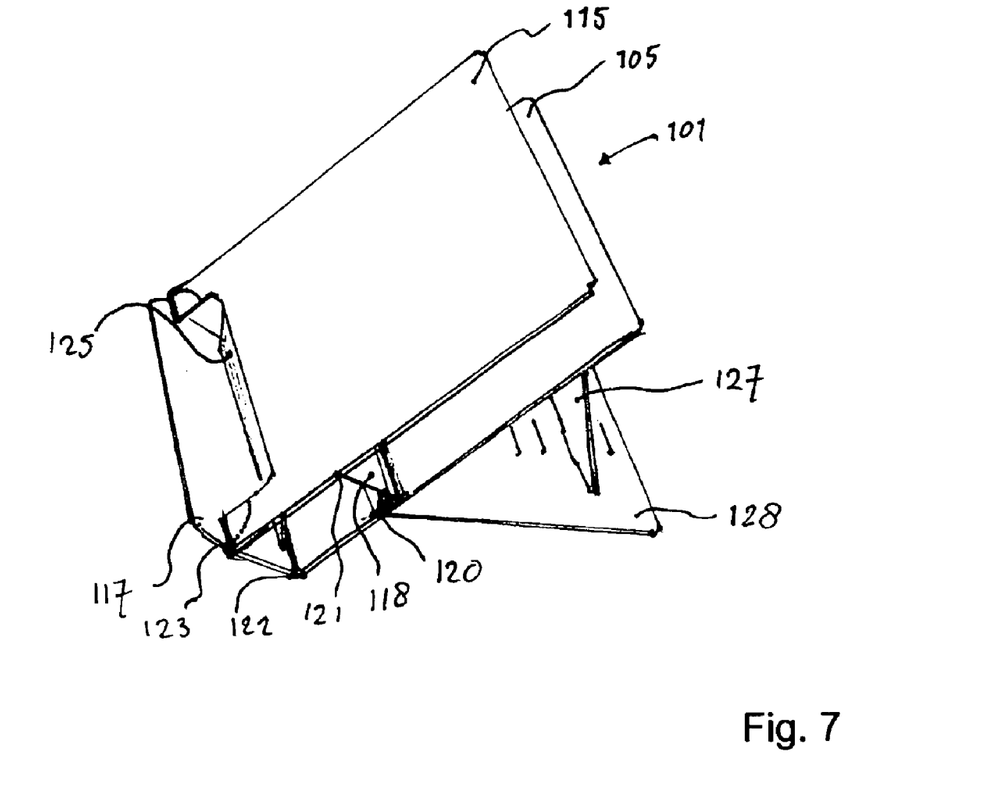
FIG. 7 is a perspective view of the support according to FIGS. 5 and 6 in operational condition.

In the exemplary embodiment shown in FIGS. 5–7, which is most preferred at the moment, the foldability of the support 101 is effected in another manner.

As appears most clearly from FIGS. 5 and 6, the document support and the keyboard support are designed as a document support plate 115 and a keyboard support plate 105 and are movable relative to each other, back and forth between an operational position (see FIG. 6), spaced apart for receiving thereinbetween a keyboard member of a portable computer, and a more closely spaced transport position (FIG. 5). With the interposition of hinges 120–123, the document support plate 115 and the keyboard support plate 105 are intercoupled by swivel panels 118, 119 between the document support plate 115 and the keyboard support plate 105 which, with the document support plate 115 and the keyboard support plate 105, define a foldable, substantially parallelogram-shaped rod system.

As a result, the support 101 can be folded up in a very compact fashion without sidewalls or the like, in folded condition, projecting far outside the document support plate 115, and the keyboard support plate 105, in operational condition, is very stable.

In operational condition, the keyboard member of the computer is located between the substantially flat document support plate 115 and the keyboard support plate 105.

In side elevation, the swivel panels 118, 119 define, with the document support plate 115 and the keyboard support plate 105, a foldable, substantially parallelogram-shaped rod system, which further promotes the operationability and stability of the foldable support. In particular, this prevents the document support plate 115 from resting on the keys of a keyboard member placed in the support 101.

The lowermost one 119 of the swivel panels 118, 119 is provided with projections 117 which, in operational condition, form a stop projecting at the bottom of the document support plate 115, which prevents documents from sliding down from the document support plate 115. When the support 101 is being folded together, the projections 117 swivel along with the lower swivel panel 119 into a position parallel to and in the plane of the document support plate 115.

In order to keep the support 101, in operational condition, in an extreme folded position and prevent it from swiveling any further, a diagonal support flap 125 is provided between the document support plate 115 and the keyboard support plate 105, which support flap 125 is mounted on the document support plate 115 so as to be pivotable about an axis 126 and, in operational condition, rests in a corner between the lower swivel panel 119 and the keyboard support plate 105. The diagonal support flap may also be pivotally mounted at its lower side and, in operational condition, be supported on the side of the document support 115 in a corner.

A first tongue 127 is pivotally mounted on the keyboard support plate 105 and in operational condition, a free end of the tongue 127 projects through an opening 129 in a second tongue 128. The incline of the document support plate 115 relative to the worktop 108 on which it stands, and accordingly also the height of the rear end of the keyboard support plate 105, defining the height of the display of the computer placed in the support 101 above the worktop, is adjustable by inserting the tongue 127 into a different slot 129 in the second tongue 128. In folded condition, the first tongue 127 fills up an opening in the keyboard support plate 105 from which that tongue 127 is cut and the second tongue 128 is folded against the keyboard support plate 105.

The outer plates in FIG. 5 may be provided with inwardly directed raised edges (not shown) which, in folded condition, form a closure along lateral edges of the support 101 and also form a stiffening and reinforcement of the support in folded condition. This prevents bending of the plates from which the support is composed. Such edges may, for instance, be obtained by bending aluminum plate over 90°.

For transporting the above-described, entirely collapsible and hence readily transportable support 101 in, for instance, hand luggage, it is of great importance that the entire construction be not too heavy. However, the support should be sufficiently firm to support the relatively heavy portable computer without any problems and to resist forces exerted thereon in an overfull bag. A solution to these contradictory demands can be found by providing that the plate material has a sandwich structure from rigid and flexible material, while the rigid material is interrupted along lines where said plate material is bent over. With such material, blanks with several panels can be manufactured with very strong and rigid panels which can easily be folded along folding lines between the panels. Preferably, two rigid plates are mounted on either side of a layer of flexible material.

Suitable sandwich material is commercially available, for instance, under the names "Dibont" and "Highlight". Such sandwich plates consist of two aluminum plates having a plastic layer thereinbetween, for instance of polypropylene. Bending hinges between panels can readily be obtained by milling off a narrow strip of aluminum on both sides of a sandwich plate, but keeping the plastic layer intact. Thus, separate hinges are not needed. Permanent fold-over portions can readily be obtained by milling off material along a line exclusively on one side of the plate (preferably the intended inner side of the fold) and subsequently bending the plate along that line. As a matter of fact, the entirely collapsible support may also be manufactured from other materials, for instance from ABS.

To prevent the housing of a computer placed in the support 101 from being damaged, soft material may be provided between the keyboard support plate 105 and the document support plate 115, for instance foam rubber. If necessary, noise-damping material may also be applied, to limit noise emission caused by, for instance, a fan or a hard disk of the computer.

Figure 8:
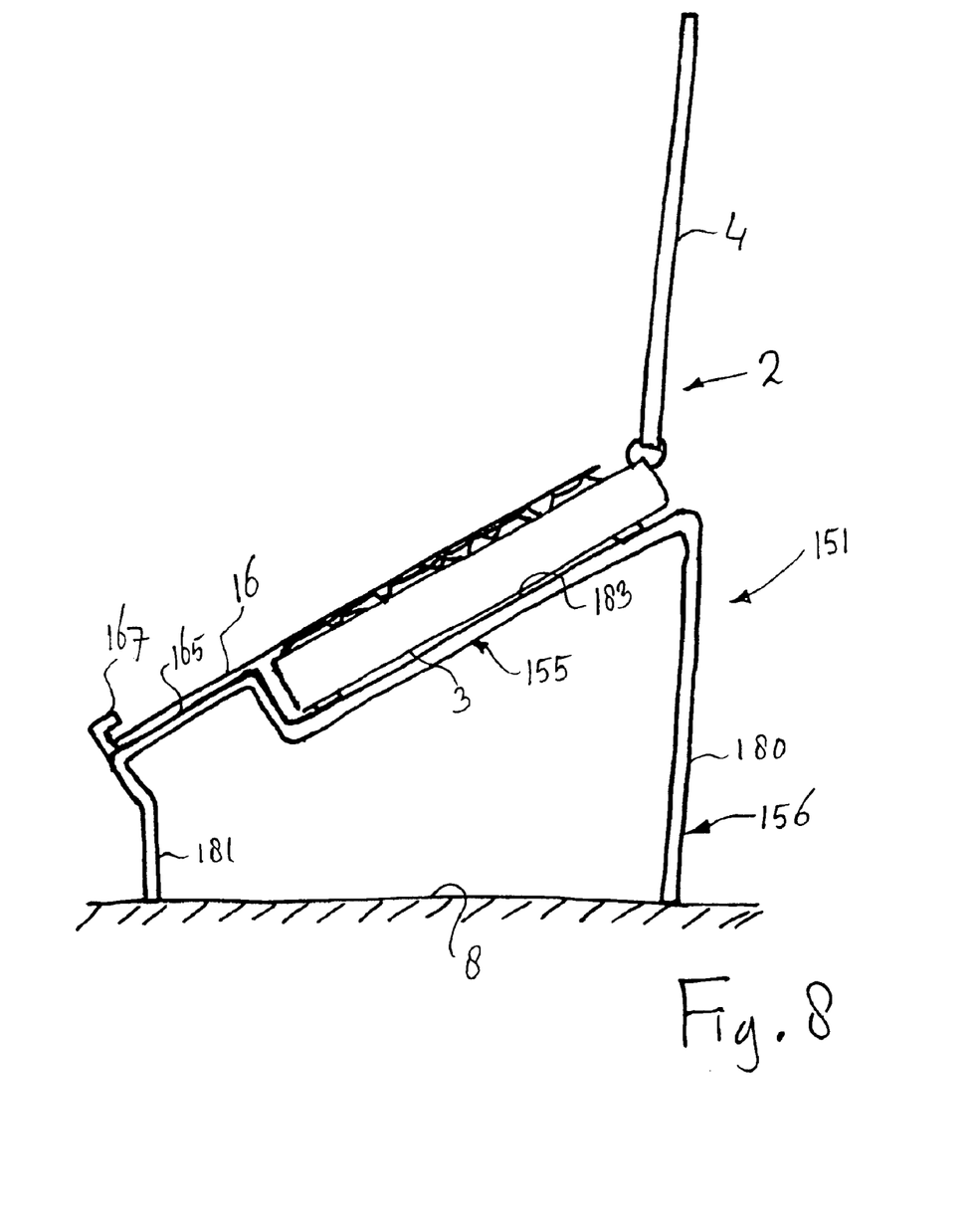
FIG. 8 is an elevational view of a support according to a further exemplary embodiment of the invention.

According to the example shown in FIG. 8, a keyboard member 3 of a portable computer 2, by its side where the display flap 4 is located at a distance above a worktop 8, is supported by a span 155. The span is supported by a bearing structure 156 having a front support panel 181 and a rear support panel 180, and has a document support 165, 167 for supporting a document 16 and a portion 183, recessed relative to a support face 165 of the support, on which the keyboard member 3 of the computer 2 rests. Apart from the support face 165, the document support comprises a stop 167 at the front side of the support 151 for keeping the document 16 positioned in an operational condition extending above said support structure 155.

According to this example, the document 16 at the front side of the support rests on the support face 165 of the support 151 and the document 16 further rests on the keyboard 3 of a computer 2 located behind the support face 165. According to this example, the support structure 155 for supporting the keyboard member 3 of the computer 2 is open towards the top. This allows the support 151 to have a simple construction and allows the computer 2 to be placed on and removed from the support 151 in a very simple manner.

It will be readily understood by anyone skilled in the art that within the framework of the present invention, still many other variants and structural possibilities are conceivable. Thus, instead of structures from plate-shaped material, grid-shaped or rack-shaped structures may be used. Construction composed from tubes or differently shaped sections are also possible. For keeping the document in position, other provisions than a stop may also be used, such as a clamp retaining the document to be retained.

What is claimed is:

1. A support for a portable computer having a keyboard member and a display flap mounted so as to be pivotable relative to said keyboard member, comprising:
   a support structure for supporting at least a portion of the keyboard member of the computer with the display flap in an operational position projecting upwardly from the keyboard member, said support structure having a lower-forward end for abutting against an end of said keyboard member remote from said display flap,
   a bearing structure which, in operational condition, projects downwards from said support structure such that at least a portion of said keyboard member located adjacent the display flap is kept at a distance above a face on which the support stands, and
   a document support for keeping positioned a document in a position extending above said keyboard member supported by said support structure and sloping backward and upward from a lower-forward end of said document support,
   said lower-forward end of said document support extending beyond said lower-forward end of said support structure for accommodating documents having a height larger than the distance between said display flap and said end of said keyboard member remote from said display flap.

2. A support according to claim 1, wherein said-document support has a stop bounding a lower side of a support face of said document support.

3. A support according to claim 1, wherein said support structure, in operational condition, is laterally open on at least one side.

4. A support according to claim 1, wherein said support structure, in operational condition, is open towards the rear.

5. A support for a portable computer having a keyboard member and a display flap mounted so as to be pivotable relative to said keyboard member, comprising:
   a support structure for supporting at least a portion of the keyboard member,
   a document support for keeping positioned a document in a position extending above said support structure, and
   a bearing structure which, in operational condition, projects downwards from said support structure and comprises at least one flat part pivotable relative to said support structure between an operational position projecting transversely relative to said support structure, such that at least a portion of said keyboard member located adjacent the display flap is kept at a distance above a face on which the support stands, and a transport position extending substantially parallel to said support structure.

6. A support according to claim 1, manufactured from locally folded, flat plate material.

7. A support for a portable computer having a keyboard member and a display flap mounted so as to be pivotable relative to said keyboard member, comprising:
   a support structure for supporting at least a portion of the keyboard member, and
   a bearing structure comprising at least one flat part pivotable relative to said support structure between an operational position projecting transversely relative to said support structure, such that at least a portion of said keyboard member located adjacent the display flap is kept at a distance above a face on which the support stands, and a transport position extending substantially parallel to said support structure,
   wherein said support structure is manufactured from locally folded, flat plate material,
   wherein the plate material has a sandwich structure from rigid and flexible material, and
   wherein the rigid material is interrupted along lines where said plate material is folded.

8. A support for a portable computer having a keyboard member and a display flap mounted so as to be pivotable relative to said keyboard member, comprising:
   a support structure for supporting at least a portion of the keyboard member,
   a document support for keeping positioned a document in a position extending above said support structure,
   a bearing structure which, in operational condition, projects downwards from said support structure and comprises at least one flat part pivotable relative to said support structure between an operational position projecting transversely relative to said support structure, such that at least a portion of said keyboard member located adjacent the display flap is kept at a distance above a face on which the support stands, and a transport position extending substantially parallel to said support structure, and
   wherein said document support and said support structure are movable back and forth relative to each other between an operational position, spaced apart for receiving thereinbetween said keyboard member of said portable computer, and a transport position closer to each other, further comprising at least one swivel panel pivotally connected between said document support and said support structure, which, in side elevation, define a foldable system with said document support and said support structure.

9. A support according to claim 8, further comprising at least two of said swivel panels, which, together with said document support and said support structure, in side elevation, define a foldable, substantially parallelogram-shaped rod system.

10. A support according to claim 9, further comprising a support member which, in operational condition, extends substantially diagonally relative to said parallelogram-shaped rod system between said document support and said support structure for keeping said parallelogram-shaped rod system in said operational condition.

11. A support according to claim 1, further comprising at least one recess at the front side of the support and below the document support for receiving a separate keyboard in a position at least partially below the document support.

12. A support for a portable computer having a keyboard member and a display flap mounted so as to be pivotable relative to said keyboard member, comprising:

a support structure for supporting at least a portion of the keyboard member of the computer with the display flap in an operational position projecting upwardly from the keyboard member, a bearing structure which, in operational condition, projects downwards from said support structure such that at least a portion of said keyboard member located adjacent the display flap is kept at a distance above a face on which the support stands, and a document support for keeping positioned a document in a position extending above said keyboard member supported by said support structure and sloping backward and upward from a lower-forward end of said document support, wherein said bearing structure includes sidewalls and wherein open, slotted recesses in said sidewalls of said bearing structure, which recesses are upwardly inclined towards the rear, form said support structure for supporting at least a portion of the keyboard member.

13. A support according to claim 1, wherein said document support extends from said lower-forward end of said document support until said lower-forward end of said support structure.

* * * * *